Figure 1:
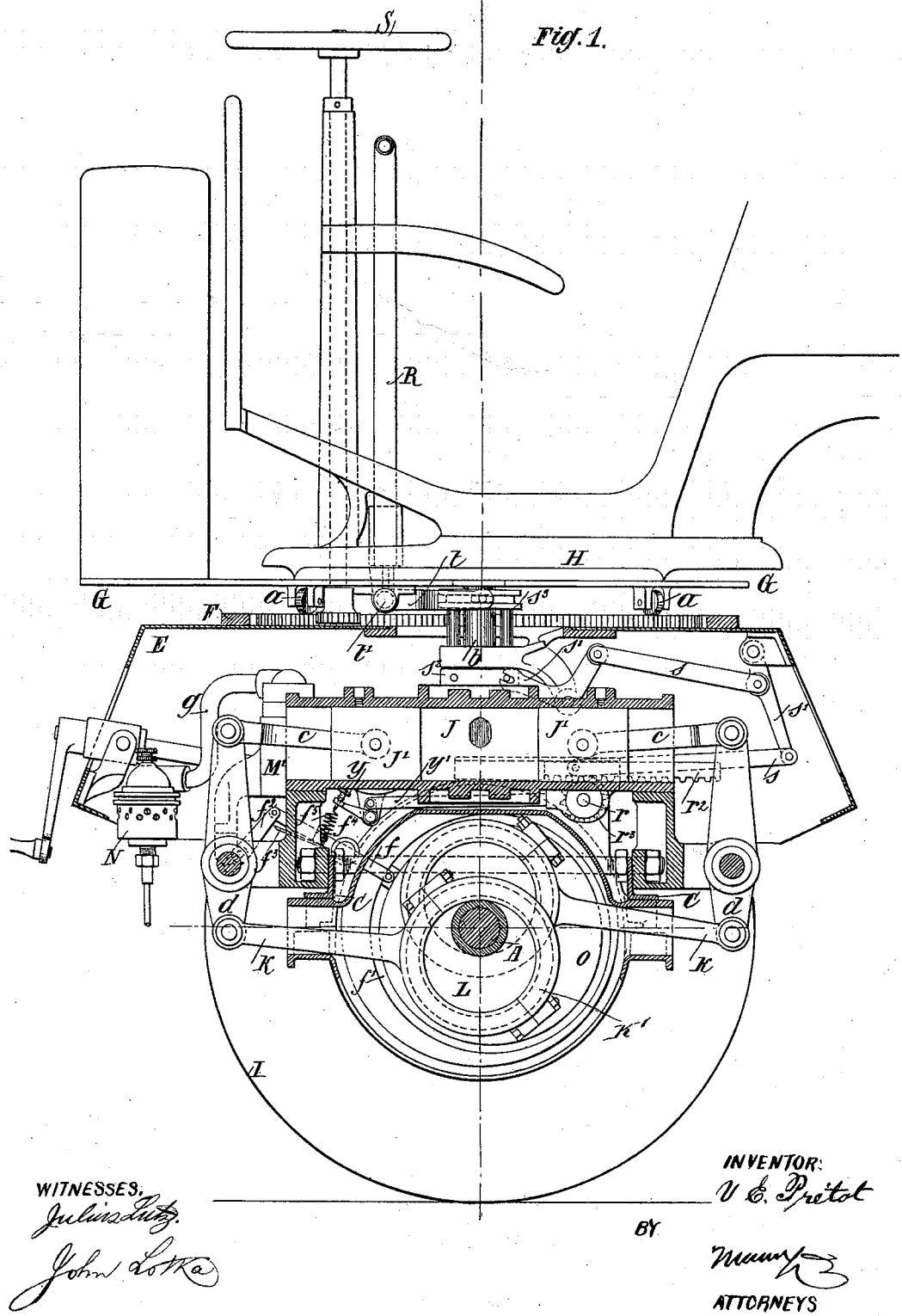

No. 610,460. Patented Sept. 6, 1898.
V. E. PRÉTOT.
SELF PROPELLING CARRIAGE.
(Application filed Feb. 26, 1897.)
(No Model.) 6 Sheets—Sheet 1.

No. 610,460. Patented Sept. 6, 1898.
V. E. PRÉTOT.
SELF PROPELLING CARRIAGE.
(Application filed Feb. 26, 1897.)
(No Model.)
6 Sheets—Sheet 2.

WITNESSES
INVENTOR:
V. E. Prétot
BY
ATTORNEYS.

No. 610,460. Patented Sept. 6, 1898.
V. E. PRÉTOT.
SELF PROPELLING CARRIAGE.
(Application filed Feb. 26, 1897.)
(No Model.) 6 Sheets—Sheet 3.

WITNESSES.
INVENTOR:
V. E. Prétot
ATTORNEYS.

No. 610,460. Patented Sept. 6, 1898.
V. E. PRÉTOT.
SELF PROPELLING CARRIAGE.
(Application filed Feb. 26, 1897.)
(No Model.) 6 Sheets—Sheet 4.
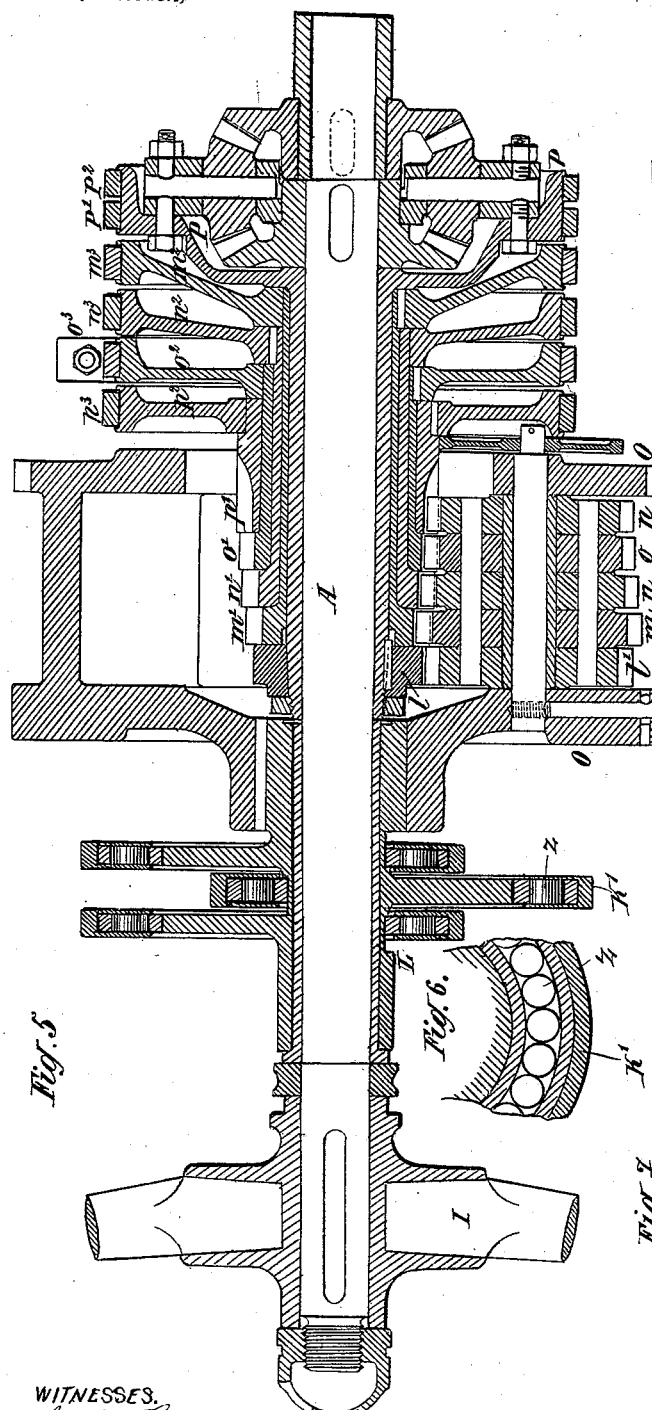
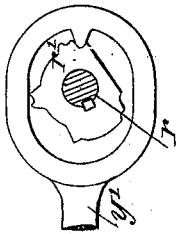
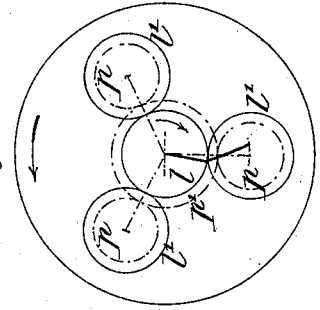
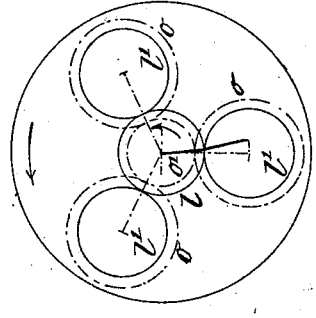
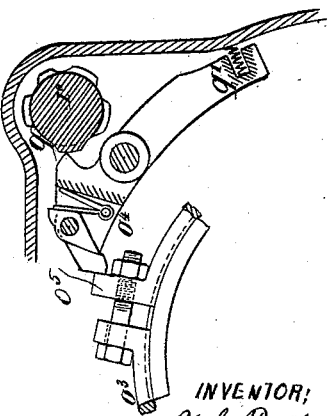
WITNESSES.
INVENTOR:
V. E. Prétot
BY
ATTORNEYS.

No. 610,460. Patented Sept. 6, 1898.
V. E. PRÉTOT.
SELF PROPELLING CARRIAGE.
(Application filed Feb. 26, 1897.)
(No Model.) 6 Sheets—Sheet 5.
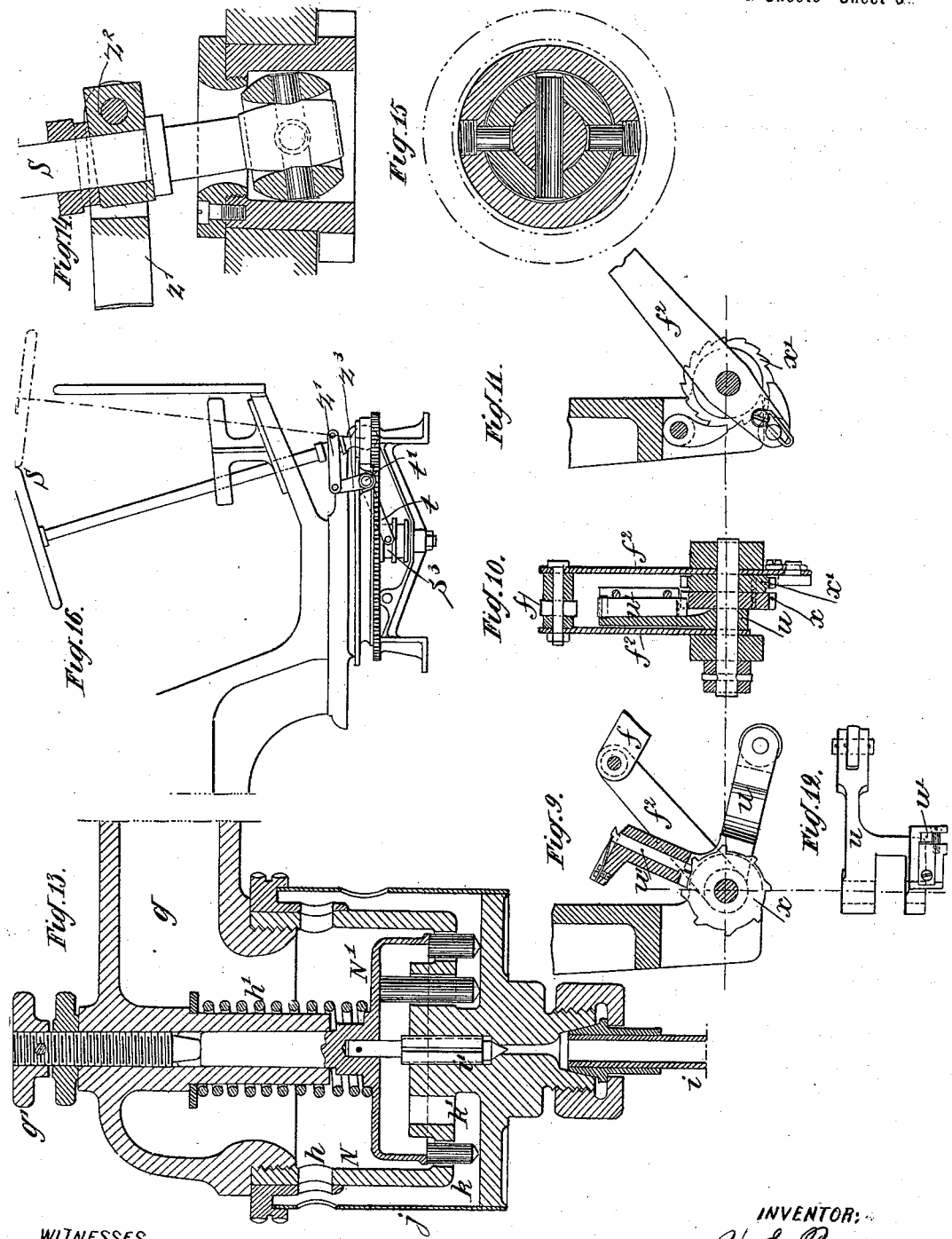
WITNESSES.
INVENTOR:
V. E. Prétot
BY
ATTORNEYS.

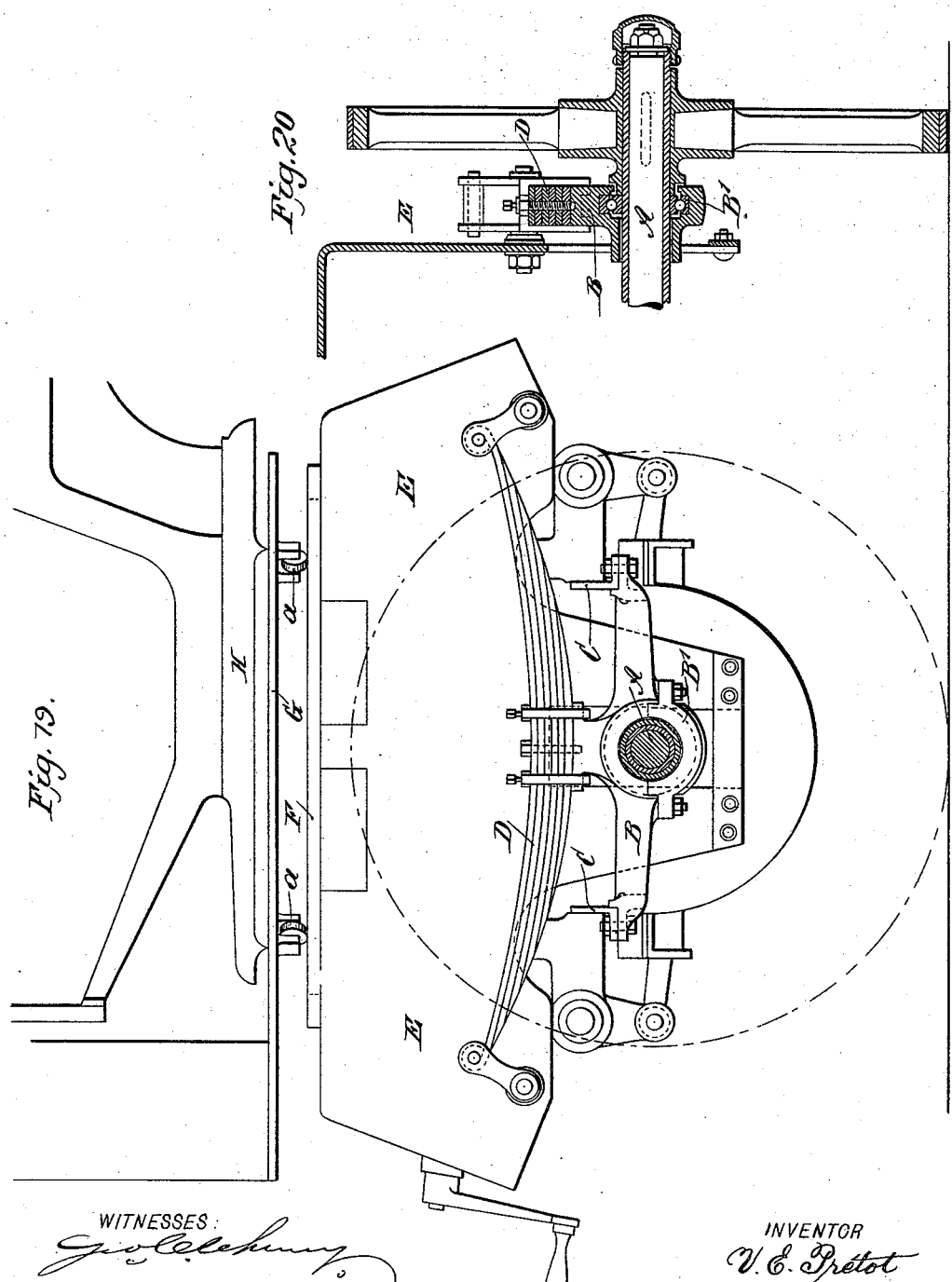

UNITED STATES PATENT OFFICE.

VICTOR ETIENNE PRÉTOT, OF PARIS, FRANCE.

SELF-PROPELLING CARRIAGE.

SPECIFICATION forming part of Letters Patent No. 610,460, dated September 6, 1898.

Application filed February 26, 1897. Serial No. 625,159. (No model.)

*To all whom it may concern:*

Be it known that I, VICTOR ETIENNE PRÉTOT, mechanician, a citizen of the Republic of France, residing in Paris, France, have invented a Self-Propelled Fore-Carriage with an Improved Petroleum-Motor, of which the following is a specification.

This invention relates to a self-propelled fore-carriage with an improved petroleum-motor applicable to vehicles of every kind.

The system of self-propelled fore-carriage which forms the subject of the present invention enables me to apply instantly mechanical traction to any carriage or vehicle usually drawn by horses by simply substituting the same for the ordinary fore-carriage. It can therefore also be employed for the same reason for the propulsion of any exclusively self-propelled vehicle.

It is easy to understand that considerable advantages are gained by reason of the possibility of transforming any existing vehicles into self-propelled vehicles, and by reason of the utilization of a single mechanical fore-carriage for the service of several carriages not having to be employed simultaneously. The application of the propulsion to the front wheels, whence it follows that the vehicle is drawn, as in the case of horses, and not pushed, as it is by the application of the motive power to the rear wheels, also insures a more rational traction and easier steering. The whole is distinct from that which constitutes the carriage proper and is adapted thereto, so to speak, without any modification. The characteristic details coöperating in the action of the whole are the following: First, the petroleum-motor with opposing and balanced pistons, which is especially distinguished by the arrangement enabling me to transmit the movement of these pistons to the driving-shaft, which is concentric to the axle itself; second, the mechanism transmitting the movement of this shaft to the axle with the requisite changes in the speed and in the direction of the movement, and serving also as a disengaging and brake apparatus; third, the combination of the speed-changing gear-wheels with a mechanism influencing the speed of the motor directly; fourth, the considerable simplification of the operations to be effected for controlling the vehicle and the means for transmitting them to the mechanisms depending on the fore-carriage despite the steering motions which it effects relatively to the principal part of the carriage where the driver is placed; fifth, the exclusive attachment to the axle of the driving mechanism, which is thus entirely independent of the carriage itself and of its suspension, the occupants not feeling any vibration, particularly as the motor is arranged for reducing them to the smallest amount.

In order that my invention may be thoroughly understood, I will hereinafter refer to the accompanying drawings, in which—

Figure 2:
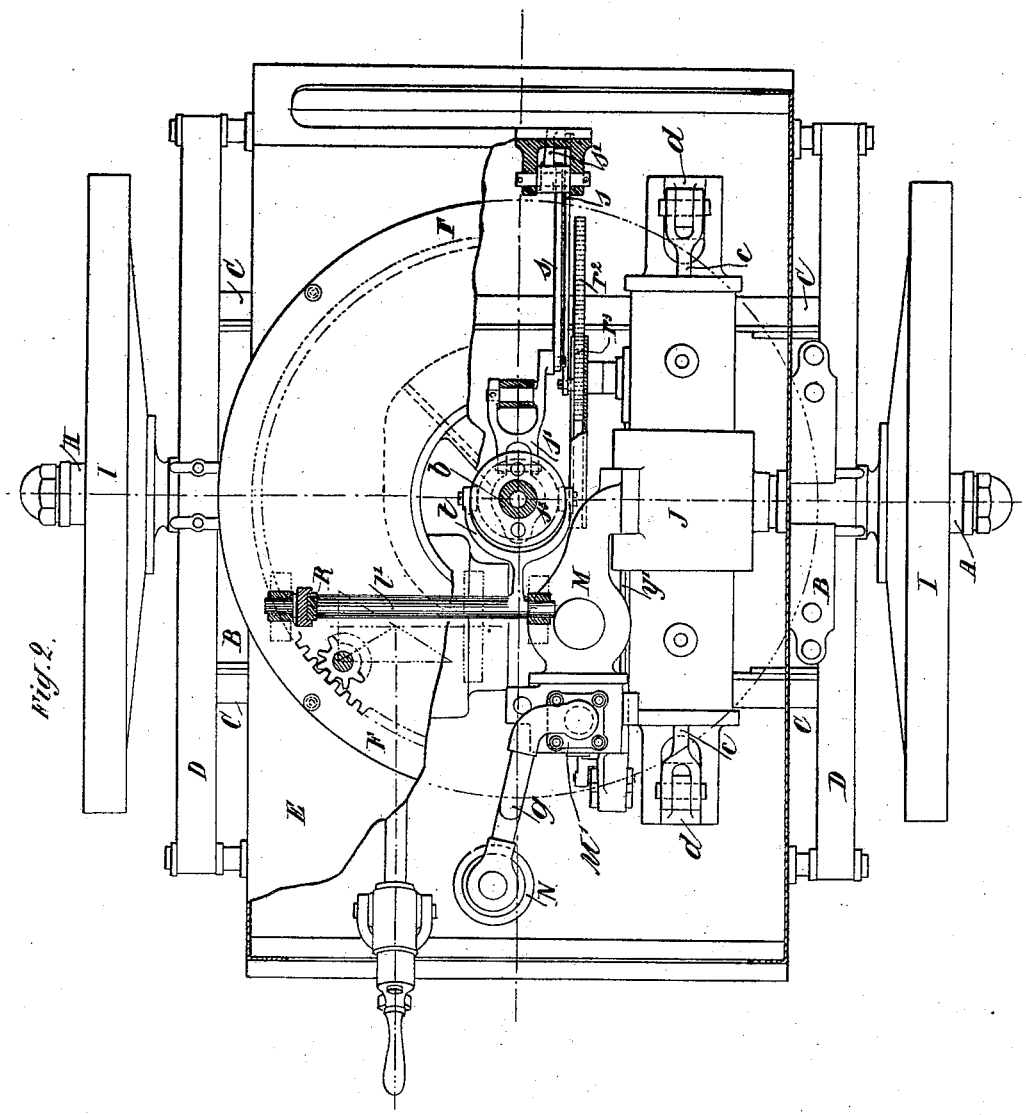
Figure 3:
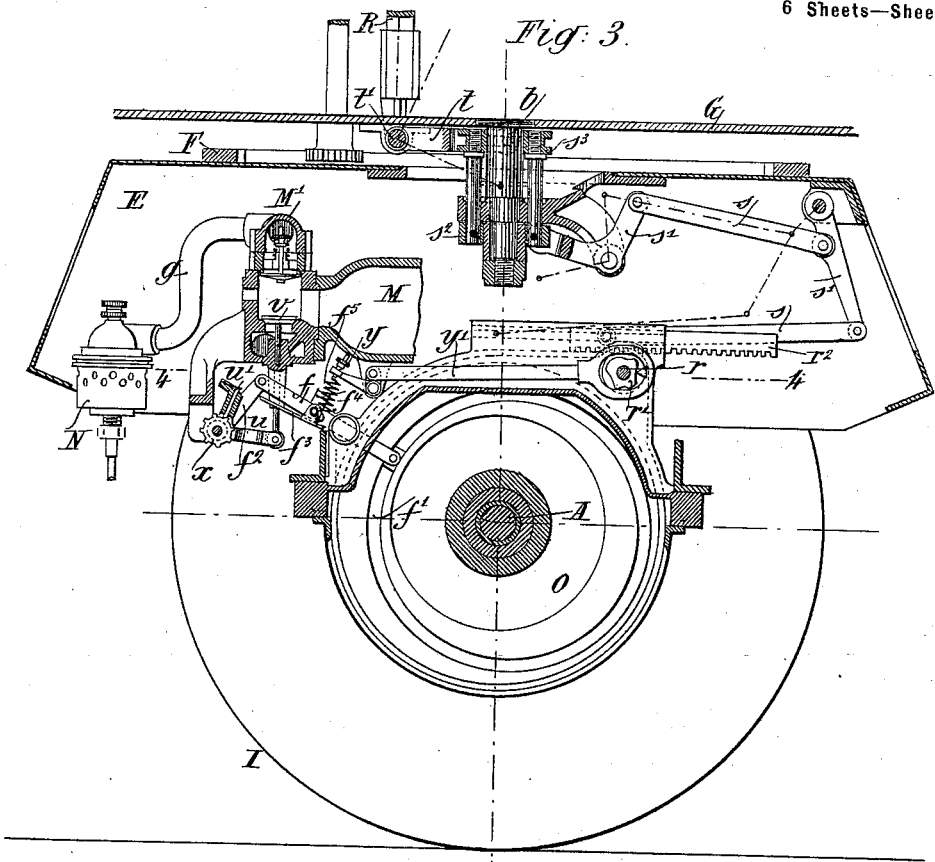
Figure 4:
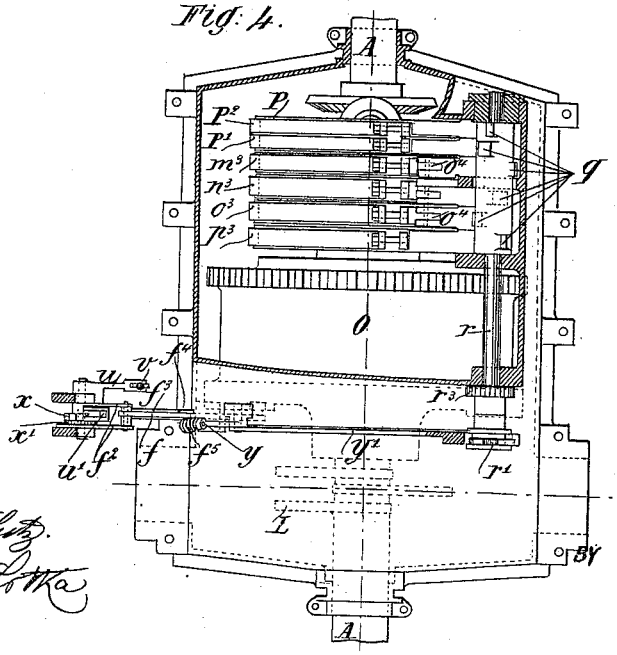

Figure 1 is a vertical section of the whole self-propelling fore-carriage constructed according to my invention. Fig. 2 is a plan of this fore-carriage, a portion being broken off to show certain parts which are placed at its lower part. Fig. 3 is a vertical section taken in a different plane from Fig. 1. Fig. 4 is a sectional plan on line 4 4 of Fig. 3. Fig. 5 is a section to an enlarged scale, taken through the axis of the driving-axle. Figs. 6 to 16 are details of construction. Figs. 17 and 18 are diagrams of the differential mechanism explaining the forward movement and the rear movement. Figs. 19 and 20 are respectively a side elevation with parts in section and an elevation taken longitudinally of the axle, showing the construction connecting the wheels with the vehicle-body.

The axle A, Figs. 1 to 5, turns in two ball-bearings, forming part of the longitudinal beams B, which receive at their extremities the transverse beams C, to which the whole driving mechanism is attached. The same longitudinal beams support in their middle the springs D, from which is suspended the sheet-metal housing E, forming guard-plates for guiding the ball-bearings for the axles and which receives the fore part of the vehicle by the steering-ring F, toothed interiorly and upon which move the rollers $a$, mounted upon a thick plate G, which is rigidly united by flanges with the fore-carriage H of the carriage, while the pivot or axis of the latter is situated in the axis $b$, in which the steering movements of the fore-carriage and of the toothed ring F take place with regard to the plate G and to the carriage proper. Accordingly the operation of adapting the self-propelled fore-carriage or vehicle referred to is limited to this attachment of the plate G to the plate H after removal of the ordinary fore-carriage, if it exists.

The wheels I are elastic by themselves by means of solid, hollow, or pneumatic rubber tires or springs of metal or springs of any other kind.

The motor is composed of a single cylinder J, open at its two extremities, Figs. 1 and 2, and in which two pistons J' are fitted to move, between which the driving action due to the explosion of the gaseous mixture is exerted. By means of connecting-rods $c$ and levers $d$ the movement of this piston is transmitted to two rods K, which act not upon cranks, as is usually the case, but upon eccentrics of opposite radii and belonging to a sleeve L, slid on the axle A and which constitutes the driving-shaft proper of the motor. The rolling movement of the collars or straps K' upon these eccentrics is effected by means of balls or rolls $z$ in order to reduce the friction to a minimum, Figs. 5 and 6. This mode of action by eccentrics is one of the characteristic features of my invention, inasmuch as it enables me to place the driving-shaft concentric to the axle and to unite upon this latter all the parts in motion relatively to the carriage, which is thus withdrawn from the trepidations or vibrations which might be caused; but these vibrations are, as it were, impossible as regards the motor itself, because the action of the explosion upon the pistons is simultaneous and opposite, and because that of the connecting-rods upon the eccentrics L is also equal and in opposite directions there is consequently exact equilibrium between the several forces, total absence of reaction upon the fixed parts, and, which is of importance, compensation of the pushing actions on the shaft, therefore obviating injurious friction between it and its support, which is here the axle itself. In order that these antagonistic forces may take place precisely in the same plane and that any abnormal reaction may be obviated, there are in practice three eccentrics—one at the center, being operated by one of the pistons, and the other two twins and operated by the other piston. (See Figs. 4 and 6.)

On the side of the cylinder is the box M, Fig. 2, entirely distinct from this cylinder and in which the compression and explosion of the mixture take place, the ignition of which may be effected at will by electricity or by an incandescent tube. In front of this box M is the valve-box M', the upper part of which communicates with the carbureter N. A circulation of cooling-water takes place around the valves and around the central part of the cylinder. The escape-valve is alone operated mechanically by the link $f$, conducted by a slide engaging with the groove $f'$, formed upon the face of the fly-wheel O of the motor. At the opposite end to said slide the link or rod $f$, Fig. 3, is connected to two levers $f^2$, Figs. 3 and 4, loosely mounted and receiving between them a bell-crank lever $u$, Figs 3, 4, 9, 10, and 12, one member of which acts on the stem of the exhaust-valve $v$, while in the other member is adapted to slide a rod $u'$, having a notch at its outer end. The notched end may project beyond the lever or be received therein completely, according to the position of a ratchet-wheel $x$, Fig. 9, on which rests the inner end of the rod $u'$. Integral or rigid with the ratchet-wheel $x$ is a similar wheel $x'$ having twice as many teeth. To one of the levers $f^2$ is secured a pawl engaging the wheel $x'$ to move it by one tooth at each revolution of the motor. Since the ratchet-wheel $x$ has only one tooth to each two of the wheel $x'$ it follows that the rod $u'$ will be raised only once for each two revolutions of the motor, to be operated by the link $f$ and work the motor according to the four-cycle system, the exhaust-valve being opened once for each two revolutions. Link $f$ acts upon the lever $u$, through the medium of an oscillating strip $f^3$, under the action of a regulating mass $f^4$, the momentum of which, opposed more or less energetically by a spring $f^5$ of variable tension, allows the said strip to act only when the motor turns within the limit of speed assigned to it, which is variable itself and at will with the tension of the before-mentioned spring $f^5$. It will be understood that when the link $f$ moves at a greater speed than the normal speed the mass $f^4$ has a corresponding tendency to stay behind, thereby lifting the strip $f^3$ and causing it to clear the notch in the rod $u'$, even when said rod is in its outer position. Consequently the exhaust-valve $v$ is not actuated, the products of combustion remain in the motor, and no new charge can be admitted. This causes the motor to slacken.

The carbureter is composed of a vessel N, Fig. 13, communicating with the cylinder through the pipe $g$, with the atmosphere, if desired, through the holes $h$, the opening of which is adapted to be regulated, and through the pipe $i$ with the petroleum-reservoir. Moreover, a casing $j$ forms a space for leading the surrounding air to two series of holes $k$ and $k'$, almost entirely closed, for the most part, by small wooden cylinders, which are conical at their lower part for enabling them to be subjected to the atmospheric pressure upward.

A valve $i'$, having a conical base and presenting small channels upon its cylindrical part for the rise of the liquids, controls the admission of the petroleum. Said valve is suspended from a bell N', under the action of a spring $h'$ and also of a screw $g'$, enabling the rise of the bell and of the valve $i$ to be limited and, if necessary, to keep said valve upon its seat for stopping the operation of the carbureter.

When a vacuum is produced in the apparatus through the pipe $g$, the outer air passing between the vessel N and the casing $j$ passes into the apparatus through those of the holes $k'$ which have been left free and acts at the same time upon the lower face of the wooden plugs, which are thus raised. By this action and by the direct action of the air the bell $N'$ is likewise raised and separates from its seat the valve $i$, which enables the petroleum to flow in its turn by reason of the lower pressure which prevails in the apparatus, provided that the sections or areas presented to the inlet of the air are suitably regulated. In proportion to its admission the petroleum is absorbed by the air arriving through the holes $k'$. Thus carbureted, this air then passes below the flange of the bell and is mixed with air, which may be allowed to pass directly through the holes $h$, if the proper proportion of the explosive mixture requires it, in order to flow next to the cylinder through the conduit $g$. The small quantities of petroleum which might not be carried away at first would drop through the holes $k$ and $k'$ onto the bottom of the vessel N and would be absorbed by the air in its passage into this part.

The transmission of the initial movement of the motor to the axle in a suitable manner as regards direction and speed takes place through the intervention of several sets of planetary differential gear-wheels, a certain number of which correspond for this axle to different speeds in the direction of the forward movement, while another set causes it to turn in the opposite direction and at a slow speed. Figs. 3, 4, 5, 17, and 18 represent these arrangements. The disk or wheel P of the differential gearing, transmitting to the two wheels I an independent movement, is actuated by a pinion $l$, keyed upon the sleeve or hub of said wheel and operated itself by the pinion or pinions $l'$ appertaining to one or more similar groups of planet-pinions carried by the fly-wheel of the motor. Each of these groups comprises, besides the pinion $l'$, a certain number of pinions $m\ n\ o\ p$, respectively, in engagement with the central pinions $m'\ n'\ o'\ p'$, each being connected with a sleeve carrying also one of the disks $m^2\ n^2\ o^2\ p^2$, which are both adapted to be rendered immovable by the stoppage of the friction-rings $m^3\ n^3\ o^3\ p^3$ surrounding each of them.

This mechanism operates in the following manner: If one of the central pinions—for instance, the pinion $o'$—is rendered immovable, the corresponding planet-pinions $o$, carried by the fly-wheel O, will rotate upon their own axes and also the pinions $l'$, which are connected therewith. The pinion $l$, actuating the axle, will therefore receive a movement resulting from the difference of diameter between it and the pinion $o'$ and between the pinions $o$ and $l'$. As will be readily seen from Figs. 17 and 18, if the central pinion $o'$ is smaller than the driven pinion $l$ the latter will receive a movement in the same direction as that of the planet-pinions, while if the central pinion $p'$ is larger than the pinion $l$ this pinion $l$ will turn in the inverse direction. By this means I am enabled, according to the set put in operation, to change at will not only the speed, but also the direction of the movement imparted to the axle by rendering one of the central pinions $m'\ n'\ o'\ p'$ immovable, while the others, which are left free, receive speeds which are given them by the corresponding planet-pinions. For this purpose the rings $m^3\ n^3\ o^3\ p^3$, surrounding the disks connected with these pinions, are pressed so as to produce a friction greater than the normal force of reaction experienced in consequence of the resistance of the vehicle by the disk rendered immovable, but capable of being overcome at least momentarily under the action of the momentum of the parts in motion. Now the stoppage of one or the other of these rings is obtained by means of a dog $o^4$, which is brought by the action of a cam $q$ into position for being encountered by the projection $o^5$ of the corresponding ring, Fig. 7, while a spring $q'$ tends, on the contrary, to separate it therefrom. The ends of each ring are connected by a screw-bolt, whereby the ring may be pressed more or less tightly against the disk it surrounds. Since the cams corresponding to the different rings occupy successive points on the circumference of their shaft $r$, only one of the dogs can be in position for stopping the corresponding ring, and in each intermediate position the mechanism is altogether free, the pinion $l$ serving in its turn as a fixed point, owing to the resistance of the vehicle, and the latter receiving no movement. There are as many positions for the disengagement; but when one of the dogs—for example, $o^4$—is pushed by its cam the ring $o^3$ is stopped by it, only, owing to the momentum of the disk $o^3$, the latter is not rendered immovable at once. Overcoming for an instant the friction caused by the ring pressing upon the same, it still continues to turn a little, thus obviating the shock which would be produced by abrupt coupling; but as soon as this momentum is spent, the energy of the friction being greater than the force corresponding to the resistance of the vehicle, this disk is stopped in its turn and the central pinion, with which it is connected, may serve as a point of support for the transmission of the movement, as set forth.

The pinions, disks, and rings $m\ n\ o$ are for the forward movement at three different speeds and those designated by $p$ for the rear movement.

The ring P of the differential gearing also receives two straps $P'$ and $P^2$, which, moreover, are each made in two parts in order to present two projecting beaks fitted to butt against the corresponding dog. These straps constitute a brake which is thus actuated by the same operation as the change or speed and disengaging gears—that is to say, by the rotation of the cam-shaft $r$. One of the two straps P' and P² is alone rendered immovable in cases where it is only desired to slacken down. The two beaks presented by each of them accelerate the action of the brake without waiting for almost an entire turn of the wheels, as might take place with a single stopping-point.

Besides the changes of speed resulting from the proportion of the gear-wheels set in action, the speed of the motor remaining constant, this movement of the motor may itself be modified, (and always by the same mechanism,) while one or the other of the sets remains in action, the limit of the possible variations in the speed thus becoming much wider. For this purpose each of the cams $q$ presents in its major axis a concentric enlargement, enabling the axis $r$ to make a certain oscillation without that of the dogs which is in engagement being liberated. At the other end this shaft terminates, Fig. 4, in a cam $r'$, presenting as many sections, Figs. 3 and 8, as there are different stages of motion, but offering each several degrees of different projections, acting lastly upon the spring hereinbefore mentioned, whose greater or smaller tension enables me to vary the speed of the motor by preventing, if necessary, the exhaust-valve being raised, which also prevents the admission of the explosive mixture. From this it follows that if any one of the sets of gear-wheels being engaged I turn the shaft $r$ through a distance not enough for disengaging this set, but modifying the tension of the regulating-spring, the velocity of the motor and that of the vehicle will undergo a corresponding modification. With three sets of gear-wheels, for example, for the forward movement and two different stages of the motor for each of them I have at disposal six different speeds for the vehicle in the normal movement. A last position of the cam $r'$ enables me to considerably slacken the motor, so as not to allow it to turn uselessly at a great speed during the stoppages. For controlling the rotation of this shaft $r$ and placing the mechanism therefor within reach of the driver, despite the variations in height due to the bending of the springs and the angular movements between the fore-carriage and the carriage itself, this shaft receives a pinion actuated by a rack $r^2$, connected by the rods and levers $s$ $s'$ to a ring $s^2$, capable of sliding vertically upon the shaft $b$, secured to the plate G, and in which is arranged and centered, if necessary, the pivot of the vehicle.

By the length and the normally horizontal position of the rods $s$ the differences in height which may occur between the shaft $r$ and the mechanisms on the plate G, the housing E, or the shaft $b$ can have no perceptible effect upon the shaft $r$. The ring $s^2$ is further connected by two rods with another grooved ring $s^3$, adapted to slide upon the same shaft $b$ and engaging with the forked lever $t$, whose shaft $t'$ carries the operating-lever R under the hand of the driver. By the operation of this ring $s^3$, displaced vertically upon the steering-shaft and always actuated by the lever $t$, the shaft $r$ may be operated by the lever or handle R, notwithstanding the angular movements necessitated by the steering of the vehicle. This steering is obtained by the operation of the hand-wheel S, whose shaft terminates in a pinion gearing with the toothed ring F. All the operations necessary for driving the vehicle—that is to say, the starting, change of speed, stoppage, brake, rear movement, and steering—may therefore be effected by means of these two parts R and S. This simplification, which is already considerable as compared with the systems generally in use, may still be increased by using the shaft of the hand-wheel S for performing the function of the lever R itself. For this purpose this shaft may be connected, Fig. 16, with its lower pinion by a swivel-joint, which leaves it free to oscillate in a plane parallel to the axis of the carriage without ceasing to be able to operate this pinion as regards the rotary motion. A rod $z'$, attached to a sleeve $z^2$, in which this axis can turn and placed at a certain distance from the center of oscillation in the pinion, then connects this axis to a lever-arm $z^3$, secured upon the shaft $t'$ of the forked lever $t$. In this modification the driver, by means of a single hand-wheel S, steers the vehicle by turning said wheel upon itself. He stops his vehicle or sets it in motion, changes the speed, or backs the carriage by rocking the shaft of this hand-wheel forward or backward on the swivel of the pinion. The mechanism is combined so that the greater speed will correspond to the forward position of the hand-wheel S and the smaller speed, as well as the reversing of the driven shaft, to the rearward position of the hand-wheel. The driver, therefore, acts upon the hand-wheel exactly as when driving a horse, which facilitates the manipulation of the vehicle and renders it more certain.

It is evident that the application of this fore-carriage to an ordinary carriage necessitates no other work of adaptation to this latter than the piercing of the holes required for the passage of the operating parts.

In conclusion, I claim the system of self-propelling fore-carriage described and represented and, more particularly,

I claim—

1. The combination of the cylinder and pistons, the hollow driving-shaft carrying eccentrics, operative connections between the pistons and the eccentrics, and the vehicle-axle passing loosely through said hollow driving-shaft, substantially as described.

2. In a horseless carriage, a hollow driving-shaft mounted loosely upon one of the carriage-wheel axles, and a motor for operating said shaft, substantially as described.

3. The combination of the driving-shaft, a series of pinions rigidly connected together and mounted to revolve with the driving-shaft, said pinions having different numbers of teeth and being mounted to rotate about an axis eccentric to that of the driving-shaft, a series of independent loose pinions concentric with the driving-shaft, and engaging the corresponding eccentric pinions, a driving mechanism connected to one of said concentric pinions, and fastening mechanisms whereby any one of the other concentric pinions may be held against rotation, as and for the purpose set forth.

4. The combination of the driving-shaft, a speed-changing mechanism comprising a series of gear-wheels having different numbers of teeth, whereby the speed may be changed without altering the number of revolutions of the driving-shaft, and a separate mechanism for changing the speed of the driving-shaft, substantially as described.

In testimony whereof I have signed my name to this specification in the presence of two subscribing witnesses.

VICTOR ETIENNE PRÉTOT.

Witnesses:
   LÉON FRANCKEN,
   EDWARD P. MACLEAN.